United States Patent
Streeter

(10) Patent No.: US 11,657,118 B2
(45) Date of Patent: May 23, 2023

(54) SYSTEMS AND METHODS FOR LEARNING EFFECTIVE LOSS FUNCTIONS EFFICIENTLY

(71) Applicant: Google LLC, Mountain View, CA (US)

(72) Inventor: Matthew John Streeter, Los Altos Hills, CA (US)

(73) Assignee: GOOGLE LLC, Mountain View, CA (US)

( * ) Notice: Subject to any disclaimer, the term of this patent is extended or adjusted under 35 U.S.C. 154(b) by 326 days.

(21) Appl. No.: 16/880,274

(22) Filed: May 21, 2020

(65) Prior Publication Data

US 2020/0372305 A1    Nov. 26, 2020

Related U.S. Application Data

(60) Provisional application No. 62/852,029, filed on May 23, 2019.

(51) Int. Cl.
| | | |
|---|---|---|
| G06K 9/62 | (2022.01) | |
| G06F 17/18 | (2006.01) | |
| G06N 3/08 | (2006.01) | |
| G06N 20/00 | (2019.01) | |
| G06N 3/084 | (2023.01) | |

(52) U.S. Cl.
CPC ........... *G06K 9/6262* (2013.01); *G06F 17/18* (2013.01); *G06N 3/084* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 11,210,144 | B2 * | 12/2021 | Goodsitt | G06K 9/6262 |
| 2014/0358831 | A1 * | 12/2014 | Adams | G06N 5/048 |
| | | | | 706/20 |
| 2016/0224903 | A1 * | 8/2016 | Talathi | G06N 3/0454 |

(Continued)

FOREIGN PATENT DOCUMENTS

| | | | | |
|---|---|---|---|---|
| EP | 3543917 A1 * | 9/2019 | | G06N 3/04 |
| WO | WO-2018212710 A1 * | 11/2018 | | |

(Continued)

OTHER PUBLICATIONS

Klein, Aaron, et al. "Fast bayesian optimization of machine learning hyperparameters on large datasets." Artificial intelligence and statistics. PMLR, 2017. (Year: 2017).*

(Continued)

*Primary Examiner* — Timothy Padot
*Assistant Examiner* — Derick J Holzmacher
(74) *Attorney, Agent, or Firm* — Dority & Manning, P.A.

(57) ABSTRACT

The present disclosure provides systems and methods that learn a loss function that, when (approximately) minimized over the training data, produces a model that performs well on test data according to some error metric. The error metric need not be differentiable and may be only loosely related to the loss function. In particular, the present disclosure presents a convex-programming-based algorithm that takes as input observed data from training a small number of models and produces as output a loss function. This algorithm can be used to tune loss function hyperparameters and/or to adjust the loss function on-the-fly during training.

20 Claims, 7 Drawing Sheets

(56) References Cited

U.S. PATENT DOCUMENTS

| | | | |
|---|---|---|---|
| 2016/0247089 A1* | 8/2016 | Zhao | G06N 20/00 |
| 2016/0328644 A1* | 11/2016 | Lin | G06N 3/04 |
| 2017/0024642 A1* | 1/2017 | Xiong | G06N 3/0454 |
| 2018/0121814 A1* | 5/2018 | Yu | G06N 3/04 |
| 2018/0240041 A1* | 8/2018 | Koch | G06F 16/24578 |
| 2018/0307986 A1* | 10/2018 | Kabul | G06F 9/46 |
| 2019/0066713 A1* | 2/2019 | Mesgarani | G10L 25/30 |
| 2019/0080253 A1* | 3/2019 | Lokare | G06N 3/08 |
| 2019/0236487 A1* | 8/2019 | Huang | G06N 20/00 |
| 2019/0244139 A1* | 8/2019 | Varadarajan | G06N 20/10 |
| 2020/0134461 A1* | 4/2020 | Chai | G06N 3/10 |
| 2020/0250515 A1* | 8/2020 | Rifkin | G06N 3/0472 |
| 2021/0224692 A1* | 7/2021 | Akiba | G06N 7/005 |

FOREIGN PATENT DOCUMENTS

| | | | | |
|---|---|---|---|---|
| WO | WO-2018226492 A1 | * | 12/2018 | G06N 3/006 |
| WO | WO-2019083578 A1 | * | 5/2019 | G06F 17/16 |
| WO | WO-2019238976 A1 | * | 12/2019 | G06K 9/4628 |

OTHER PUBLICATIONS

Duan, Kaibo, S. Sathiya Keerthi, and Aun Neow Poo. "Evaluation of simple performance measures fortuning SVM hyperparameters." Neurocomputing 51 (2003): 41-59. (Year: 2003).*

Foo, Chuan-sheng, and Andrew Ng. "Efficient multiple hyperparameter learning for log-linear models." Advances in neural information processing systems 20 (2007). (Year: 2007).*

Yu, Jiaqian, and Matthew Blaschko. "A convex surrogate operator for general non-modular loss functions." Artificial Intelligence and Statistics. PMLR, 2016. (Year: 2016).*

Keerthi, Sathiya, Vikas Sindhwani, and Olivier Chapelle. "An efficient method for gradient-based adaptation of hyperparameters in SVM models." Advances in neural information processing systems 19 (2006). (Year: 2006).*

Bengio, "Gradient-Based Optimization of Hyperparameters", Neural Computation, vol. 12, 2000, pp. 1889-1900.

Caruana et al., "Overfitting in Neural Nets: Backpropagation, Conjugate Gradient, and Early Stopping", Advances in Neural Information Processing Systems 13, May 2001, 7 pages.

Cohen et al., "Solving Linear Programs in the Current Matrix Multiplication Time", arXiv:1810.07896v2, Nov. 23, 2019, 42 pages.

Diaconis et al., "Conjugate Priors for Exponential Families", The Annals of Statistics, vol. 7, No. 2, 1979, pp. 269-281.

Diamond et al., "CVXPY: A Python-Embedded Modeling Language for Convex Optimization", Journal of Machine Learning Research, vol. 17, 2016, 5 pages.

Donahue et al., "DeCAF: A Deep Convolutional Activation Feature for Generic Visual Recognition", 31st International Conference on Machine Learning, Jun. 21-26, 2014, Beijing, China, 9 pages.

Duchi et al., "Adaptive Subgradient Methods for Online Learning and Stochastic Optimization", Journal of Machine Learning Research, vol. 12, Jul. 2011, pp. 2121-2159.

Fan et al., "Learning to Teach", International Conference on Learning Representations, Apr. 30-May 3, 2018, Vancouver, Canada, 16 pages.

Fei-Fei et al., "Learning Generative Visual Models from Few Training Examples: An Incremental Bayesian Approach Tested on 101 Object Categories", Computer Vision and Pattern Recognition Workshop, Jun. 27-Jul. 2, 2004, Washington, D.C., 9 pages.

Frank et al., "A Statistical View of Some Chemometrics Regression Tools", Technometrics, vol. 35, No. 2, May 1993, pp. 109-135.

Fu, "Penalized Regressions: The Bridge Versus the Lasso", Journal of Computational and Graphical Statistics, vol. 7, No. 3, 1998, 20 pages.

Hoerl et al., "Ridge Regression: Biased Estimation for Nonorthogonal Problems", Technometrics, vol. 12, No. 1, Feb. 1970, pp. 55-67.

Jiang et al., "Predicting the Generalization Gap in Deep Networks with Margin Distributions", International Conference on Learning Representations, May 6-9, 2019, New Orleans, Louisiana, pp. 1-19.

Kather et al., "Multi-class texture analysis in colorectal cancer histology". Scientific Reports, vol. 6:27988, Jun. 2016, 11 pages.

LeCun et al., "Gradient-Based Learning Applied to Document Recognition", Proceedings of the IEEE, vol. 86, No. 11, Nov. 1998, 46 pages.

Liang et al., "Asymptotically Optimal Regularization in Smooth Parametric Models", Twenty Third Annual Conference on Neural Information Processing Systems, Dec. 7-12, 2009, Vancouver, British Columbia, Canada, 9 pages.

MacKay et al., "Self-Tuning Networks: Bilevel Optimization of Hyperparameters Using Structured Best-Response Functions", Seventh International Conference on Learning Representations, May 6-9, 2019, New Orleans, Louisiana, 25 pages.

McMahan et al., "Ad Click Prediction: a View from the Trenches", 19th ACM SIGKDD Conference on Knowledge Discovery and Data Mining (KDD), Aug. 11-14, 2013, Cincago, Illinois, 9 pages.

McMahan, "A Survey of Algorithms and Analysis for Adaptive Online Learning", The Journal of Machine Learning, vol. 18, Aug. 2017, 50 pages.

Parkhi et al., "Cats and Dogs", IEEE Conference on Computer Vision and Pattern Recognition, Jun. 16-21, 2012, Providence, Rhode Island, 8 pages.

Pedregosa, "Hyperparameter optimization with approximate gradient", Proceedings of the 33rd International Conference on Machine Learning, PMLR, vol. 48, 2016, 10 pages.

Russakovsky et al., "ImageNet Large Scale Visual Recognition Challenge", arXiv:1409.0575v3, Jan. 30, 2015, 43 pages.

Snoek et al., "Practical Bayesian Optimization of Machine Learning Algorithms", Advances in Neural Information Processing Systems 25 (NIPS), 2012, 9 pages.

Srivastava et al., "Dropout: A Simple Way to Prevent Neural Networks from Overfitting", The Journal of Machine learning Research, vol. 15, No. 56, 2014, pp. 1929-1958.

Streeter, "Learning Optimal Linear Regularizers", 36th International Conference on Machine Learning, Jun. 9-15, 2019, Long Beach, CA, 9 pages.

Szegedy et al., "Rethinking the Inception Architecture for Computer Vision", IEEE Conference on Computer Vision and Pattern Recognition, Jun. 26-Jul. 1, 2016, Las Vegas, Nevada, pp. 2818-2826.

Tensorflow.org, "Retraining an Image Classifier", https://www.tensorflow.org/hub/tutorials/image_retraining, retrieved on Apr. 6, 2021, 12 pages.

Tensorflow.org, "tf_flowers", https://www.tensorflow.org/datasets/catalog/tf_flowers, retrieved on Apr. 7, 2021, 4 pages.

Tibshirani, "Regression Shrinkage and Selection via the Lasso", Journal of the Royal Statistical Society, Senes B, vol. 58, No. 1, 1996, pp. 267-288.

Wu et al., "Bayesian Optimization with Gradients", Thirty-first Conference on Neural Information Processing Systems, Dec. 4-9, 2017, Long Beach, CA, 12 pages.

Wu et al., "Learning to Teach with Dynamic Loss Functions", Thirty-second Conference on Neural Information Processing Systems, Dec. 3-8, 2018, Montreal, Canada, 12 pages.

Zhang et al., "Understanding Deep Learning Requires Rethinking Generalization", International Conference on Learning Representations, Apr. 24-26, 2017, Toulon, France, 15 pages.

Zou et al., "Regularization and variable selection via the elastic net", Journal of the Royal Statistical Society, Series B, vol. 67, No. 2, 2005, pp. 301-320.

* cited by examiner

Algorithm LearnLoss

Input: Set of (validation error, feature vector) pairs $\{(\tilde{e}_i, \phi_i) \mid 1 \leq i \leq m\}$, feasible hypercube $\mathcal{F} \subseteq \mathbb{R}^k$, scalar $\epsilon \geq 0$.
Optional input: gradient vectors $g_i \in \mathbb{R}^n$, and Jacobian matrices $J_i \in \mathbb{R}^{n \times k}$, for $1 \leq i \leq m$. Here $g_i = \nabla \tilde{e}(\theta_i)$, and column $j$ of $J_i$ is $\nabla \phi_j(\theta_i)$, where $\theta_i$ is the model for pair $(\tilde{e}_i, \phi_i)$.

Sort $(\tilde{e}_i, \phi_i)$ pairs in ascending order of validation error, and reindex so $\tilde{e}_1 \leq \tilde{e}_2 \leq \ldots \leq \tilde{e}_m$.
for $i^*$ from $1$ to $m$ do
  Solve the following convex quadratic program:

$$\underset{\lambda \in \mathcal{F}, \alpha \in \mathbb{R}_+}{\text{minimize}} \quad \sum_{i=1}^{m}(\ell_i - \alpha \cdot \tilde{e}_i)^2 + \epsilon \cdot \overbrace{\frac{1}{m} \sum_{i=1}^{m} \|J_i \lambda^T - \alpha \cdot g_i\|_2^2}^{\text{if gradients were provided as input}}$$

$$\text{subject to} \quad \begin{aligned} \ell_i &= \lambda \cdot \phi_i & i^* \nless i \\ \ell_i &\leq \tilde{e}_i & i^* \nless i \end{aligned}$$

If the QP is feasible, return $\lambda$.

Figure 2

Algorithm TuneLoss

Input: validation error $\tilde{\epsilon}$, initial set of models $\Theta_0 \subseteq \Theta$, feature vector function $\phi : \Theta \to \mathbb{R}^k$, initial warm-start model $\hat{\theta}_0 \in \Theta_0$, feasible hypercube $\mathcal{F}$, scalar $\epsilon \geq 0$.

Set $D_0 \leftarrow \{(\tilde{\epsilon}(\theta), \phi(\theta)) \mid \theta \in \Theta_0\}$.

for $i = 1, 2, \ldots$ do

Set $\lambda_i \leftarrow \text{LearnLoss}(D_{i-1}, \mathcal{F}, \epsilon)$.

Set $\hat{\theta}_i \leftarrow \text{train\_with\_warm\_start}((\ell_i, \hat{\theta}_{i-1}),$ where $\ell_i(\theta) \equiv \lambda_i \cdot \phi(\theta)$.

Set $D_i \leftarrow D_{i-1} \cup \left\{ (\tilde{\epsilon}(\hat{\theta}_i), \phi(\hat{\theta}_i)) \right\}$.

Figure 3

SYSTEMS AND METHODS FOR LEARNING EFFECTIVE LOSS FUNCTIONS EFFICIENTLY

RELATED APPLICATIONS

This application claims priority to and the benefit of U.S. Provisional Patent Application No. 62/852,029, filed May 23, 2019. U.S. Provisional Patent Application No. 62/852,029 is hereby incorporated by reference in its entirety.

FIELD

The present disclosure relates generally to machine learning. More particularly, the present disclosure relates to systems and methods for efficiently learning loss functions effective to train improved machine-learned models.

BACKGROUND

Most machine learning models are obtained by minimizing a training loss function (e.g., through performance of gradient descent techniques combined with, for example, backpropagation of the loss function). However, optimization of the training loss function is rarely (if ever) the ultimate goal. Instead, following training, the trained model is judged based on its performance on test data not seen during training, typically using a performance metric that may be only loosely related to the training loss. Thus, although the ultimate value of a model (e.g., as represented by the evaluated performance metric) depends critically on the loss function one chooses to minimize, the loss function typically does not approximate or relate directly to evaluated performance metric.

As one example of the discrepancy described above, machine-learned image classification models are often trained using a "log loss" training loss function which determines a log loss between the labels predicted by the model and ground truth training labels. However, it is common in some scenarios to test and evaluate machine-learned image classification models in terms of top-1 or top-5 accuracy, in which the model is evaluated based on whether the target ground truth label is one of the top 1 or 5 predictions, respectively. Thus, the log loss training loss function does not optimize the model's test performance.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to learn improved loss functions. The method includes, for each of one or more learning iterations, determining, by one or more computing devices, a plurality of feature vectors respectively associated with a plurality of machine-learned models. The feature vector for each machine-learned model describes a respective performance of the machine-learned model on each of a plurality of loss function components. The method includes, for each of the one or more learning iterations, determining, by one or more computing devices, a plurality of validation errors respectively for the plurality of machine-learned models. The validation error for each machine-learned model describes a performance of the machine-learned model relative to a validation metric. The method includes, for each of one or more optimization iterations included in each of the one or more learning iterations: attempting to optimize, by the one or more computing devices, a cost function to learn a vector of variable hyperparameter values subject to a constraint. The cost function evaluates a sum, for all of the machine-learned models, of an absolute or squared error between a respective loss function for each machine-learned model and the validation error for such machine-learned model. The respective loss function for each machine-learned model comprises the feature vector for the machine-learned model respectively multiplied by the vector of variable hyperparameter values. The constraint requires that the vector of variable hyperparameter values be such that minimization of the respective loss for each machine-learned model returns a current machine-learned model associated with a current optimization iteration. The method includes, for each of the one or more optimization iterations: if the cost function is successfully optimized subject to the constraint, providing the vector of variable hyperparameter values as an output.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 2 illustrates a first example algorithm according to example embodiments of the present disclosure.

FIG. 3 illustrates a second example algorithm according to example embodiments of the present disclosure.

Figure 1:
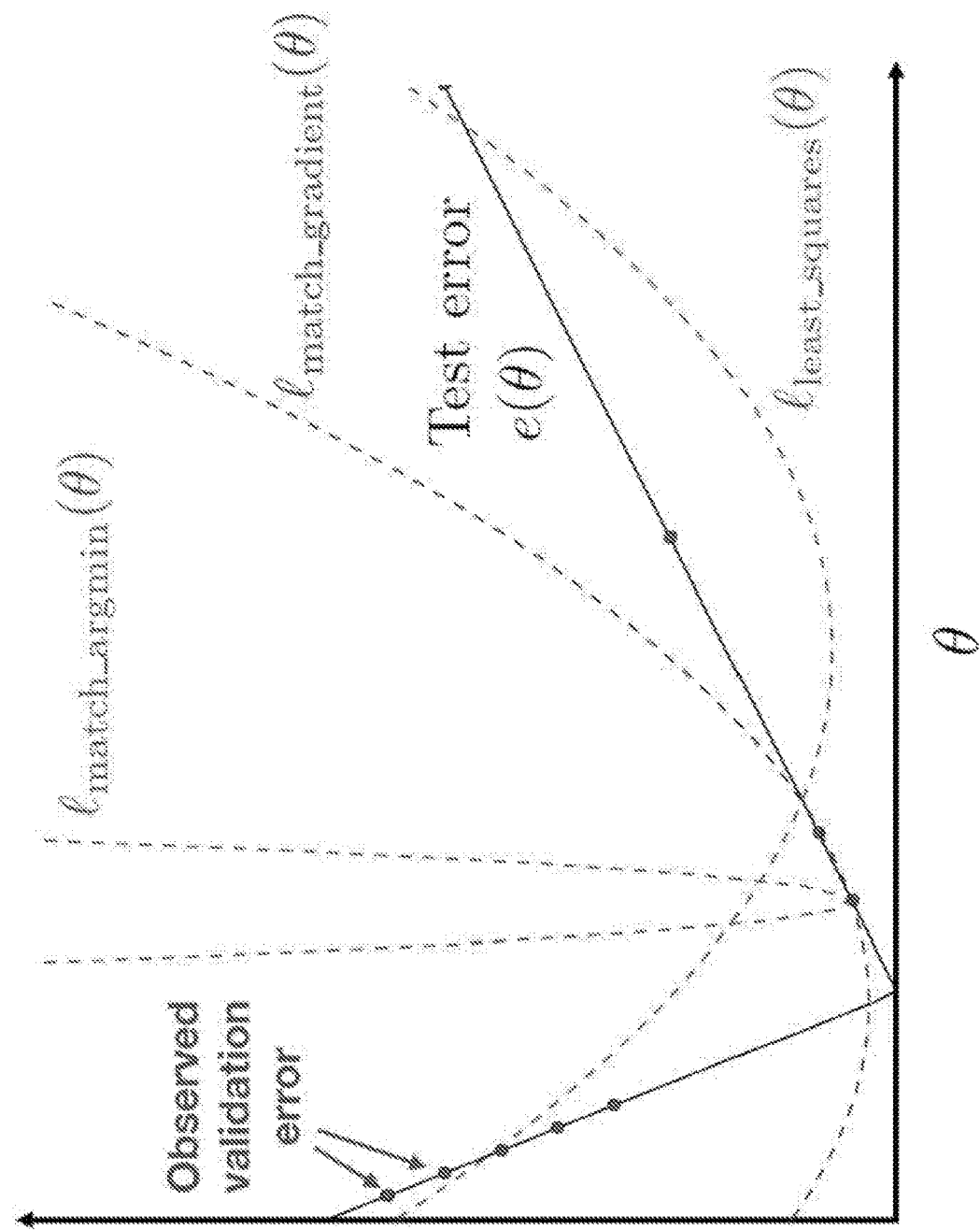
FIG. 1 illustrates a comparison of three example quadratic loss functions, on a one-dimensional minimization problem.

Reference numerals that are repeated across plural figures are intended to identify the same features in various implementations.

DETAILED DESCRIPTION

Overview

Generally, the present disclosure is directed to systems and methods that learn a loss function that, when (approximately) minimized over the training data, produces a model that performs well on test data according to some error metric. The error metric need not be differentiable and may be only loosely related to the loss function. In particular, the present disclosure presents a convex-programming-based algorithm that takes as input observed data from training a small number of models and produces as output a loss function. This algorithm can be used to tune loss function hyperparameters and/or to adjust the loss function on-the-fly during training. The algorithm comes with appealing theoretical guarantees and has performed very well in experiments, as illustrated by example experimental data included in U.S. Provisional Patent Application No. 62/852,029, which is fully incorporated into and forms a portion of this disclosure.

Furthermore, in contrast to previous work, the proposed algorithms can make use of gradient information in the case where the error metric is differentiable (or can be approximated by a differentiable proxy function). As the experimental data shows, using gradient information can dramatically accelerate the search for a good loss function, and allows efficient discovery of loss functions with hundreds of hyperparameters on-the-fly during training.

Thus, the systems and methods of the present disclosure provide solutions to the problem of learning a loss function which, when minimized over a training dataset, yields a model that approximately minimizes a validation error metric. Though learning an optimal loss function is NP-hard, the present disclosure presents an anytime algorithm that is asymptotically optimal in the worst case, and is provably efficient in an idealized "easy" case.

The systems and methods of the present disclosure provide a number of technical effects and benefits. As one example, the techniques described herein enable learning of a loss function that improves, relative to use of traditional loss functions, the ability of a machine-learned model to perform a task (e.g., an image processing, computer vision task, sensor data processing task, audio processing task, text processing task, classification task, detection task, recognition task, etc.). Thus, the systems and methods of the present disclosure can improve the ability of a computing system that includes the machine-learned model to perform various practical applications, thereby improving the functioning of such a computing system.

As another example technical effect and benefit, the techniques described herein enable tuning of loss function hyperparameters is a much more efficient fashion than existing techniques, such as, for example, black box optimization techniques. In particular, the techniques described herein provide order-of-magnitude improvements in the number of training runs that must be performed to reach a given test error. Thus, the techniques described herein enable learning of high quality machine-learned models through performance of a fewer number of training iterations. Reducing the number of training iterations that are required to be performed conserves computing resources such as reducing the amount of processor usage, memory usage, network bandwidth usage, and/or the like, thereby improving the functioning and resource consumption of the computing system itself.

Example Problem Statement

Aspects of the present disclosure consider a general learning problem where the goal is to produce a model from some set $\Theta \subseteq \mathbb{R}^n$ of models, so as to minimize a test error e: $\Theta \to \mathbb{R}_{\geq 0}$. Our model is obtained by minimizing a training loss $\ell: \Theta \to \mathbb{R}_{\geq 0}$, which belongs to a set $\mathcal{L}$ of possible loss functions. We would like to find the $\ell \in \mathcal{L}$ that, when minimized, produces the lowest test error. That is, we wish to solve the bilevel minimization problem:

$$\min_{\ell \in \mathcal{L}} \{e(\hat{\theta}(\ell))\} \text{ where } \hat{\theta}(\ell) \equiv \operatorname{argmin}_{\theta \in \Theta}\{\ell(\theta)\} \qquad (1)$$

We assume that for any loss function $\ell \in \mathcal{L}$, we can (approximately) minimize $\ell$ to obtain $\hat{\theta}(\ell)$, and that for any model $\theta \in \Theta$, we can compute a validation error $\bar{e}(\theta)$, which is an estimate of test error. In some cases, we may also be able to compute the gradient of validation error, $\nabla \bar{e}(\theta)$.

We will consider the case in which $\mathcal{L}$ is the set of linear functions of some user-provided feature vector $\phi: \Theta \to \mathbb{R}^k$, which may be problem-specific. That is, we assume $$\mathcal{L} = \{\ell_\lambda | \lambda \in \mathbb{R}^k\}, \text{ where } \ell_\lambda(\theta) \equiv \lambda \cdot \phi(\theta)$$

Our goal is therefore to find the $\lambda \in \mathbb{R}^k$ that minimizes (1). We will also consider the case where $\lambda$ is constrained to belong to some feasible set $F \subseteq \mathbb{R}^k$.

Example Applications

The problem of learning an optimal linear loss function has many applications. Perhaps the most obvious application is tuning loss function hyperparameters. As an example, suppose we wish to do softmax regression with L1 and L2 regularization. Our loss function is of the form:

$$\ell(\theta) = \lambda_1 \|\theta\|_1 + \lambda_2 \|\theta\|_2^2 + \text{logloss}(\theta) \qquad (2)$$

This loss function is linear with respect to the feature vector $\phi(\theta) = \langle \|\theta\|_1, \|\theta\|_2^2, \text{logloss}(\theta) \rangle$. Thus, finding an optimal loss function of the form $\lambda \cdot \phi(\theta)$ will (after suitable rescaling) give us the optimal values of the hyperparameters $\lambda_1$ and $\lambda_2$ (and potentially an additional hyperparameter for the logloss term).

As a second example, suppose we wish to train an ImageNet classifier using data augmentation. Given a set of k possible image transformations (e.g., flipping horizontally, converting to grayscale), we apply a transformation drawn randomly from some distribution whenever we train on an image. The expected loss is of the form:

$$\ell(\theta) = \sum_{j=1}^{k} p_j \ell_j(\theta) \qquad (3)$$

where $\ell_j$ is the log loss on a version of the ImageNet training set to which transformation j has been applied. Finding an optimal probability distribution is equivalent to finding an optimal loss of the form $\lambda \cdot \langle \ell_1, \ell_2, \ldots, \ell_k \rangle$ (which we can scale by a $$\frac{1}{\|\lambda\|_1}$$

factor to convert to the desired form).

As a final example, suppose we again wish to do softmax regression, but rather than assuming a regularizer of a specific form (e.g., L1 or L2) we wish to use a learned convex function r:

$$\ell(\theta) = \text{logloss}(\theta) + \sum_{i=1}^{n} r(\theta_i) \quad (4)$$

To find an approximately optimal loss function of this form, we may require r∈convex_pwl(X), where convex_pwl(X) is the set of convex, piecewise-linear functions that change slope at a predefined, finite set $X \subset \mathbb{R}$ of points. It can be shown that this is equivalent to the set of non-negative linear combinations of the functions $\{f_{\sigma,a}|\sigma \in \{-1, 1\}, a \in X\}$, where $f_{\sigma,a}(x) \equiv \max\{0, \sigma(x-a)\}$. Using this fact, we can write $\ell$ as a linear function of a feature vector of length 1+2|X|, whose first component is logloss(θ), and whose remaining components are of the form $$\sum_{i=0}^{n} f_{\sigma,a}(\theta_i).$$

By learning a linear loss function of this form, we can discover novel, problem-specific regularizers.

Example Analysis

We first consider the computational complexity of computing an optimal linear loss function. We find that:

Computing an optimal linear loss function is NP-hard, even under strong assumptions about the set of models Θ the validation error ẽ, and the feature vector ϕ.

However, if Θ is finite, an optimal loss function can be computed in time polynomial in |Θ|.

These findings suggest that we might select a finite set $\Theta_0 \subset \Theta$ of models, then compute (in time polynomial in $|\Theta_0|$) a loss function that is optimal when minimized over $\Theta_0$ (rather than over all of Θ). One might hope that if $\Theta_0$ is sufficiently "representative", such a loss function would also give good results when minimized over all of Θ.

How big does $\Theta_0$ have to be in practice? We address this question both theoretically and experimentally. Theoretically, we show that in the special case where $\tilde{e}(\theta) = \lambda \Delta^* \cdot \phi(\theta)$, we can recover $\lambda^*$ after computing $\tilde{e}(\theta)$ and $\nabla \tilde{e}(\theta)$ for a single model θ. Experimentally, we show:

When used to tune loss function hyperparameters based on results of full training runs, our algorithm can outperform state-of-the-art alternatives by multiple orders of magnitude.

By tuning the loss function online, we can achieve test error competitive with the results of extensive hyperparameter tuning during the course of a single training run.

Example Discussion of Loss Functions

A good loss function is one that we can (approximately) minimize, and one whose argmin has low test error. To ensure that the loss functions we consider can be approximately minimized, we confine our attention to linear functions of a user-provided feature vector (which can be minimized efficiently if, for example, each component of the feature vector is a convex function of θ). How can we guarantee that the argmin of training loss has low test error?

Assume we have already trained a small set $\Theta_0$ of models and estimated the test error of each of them using a validation set. Given this data, we would like to produce a new loss function that, when minimized, yields a model with better validation error than any model we have already trained.

Ideally, we would find a loss function $\ell$ such that $\ell(\theta) = e(\theta) \ \forall \theta \in \Theta$, where $e(\theta)$ is the test error. Minimizing $\ell$ would then give the best possible test error. With this in mind, we might attempt to find an $\ell$ that estimates validation error as accurately as possible, for example in terms of mean squared error over all $\theta \in \Theta_0$. Unfortunately, the argmin of such a loss function may be far from optimal. FIG. 1 illustrates this point for a one-dimensional model θ, where test error is a piecewise-linear function of θ, but training loss is constrained to be a quadratic function of θ.

To address this, we might seek a loss function that has the same argmin as validation error when minimized over $\Theta_0$ (rather than over all Θ). Letting $\theta_0^*$ be the model in $\Theta_0$ with least validation error, we can easily construct such a function by setting $\ell(\theta) = \|\theta - \theta_0^*\|_2^2$. However, this loss function is clearly not useful, because minimizing it gives us back a model we have already seen.

Finally, we might seek a loss function that, in addition to having the argmin-matching property, approximates validation error well for models close to $\theta_0^*$. In the case where ẽ is differentiable, this can be achieved by seeking a loss function $\ell$ with $\nabla \ell(\theta_0^*) \approx \nabla \tilde{e}(\theta_0^*)$, subject to the constraint $\text{argmin}_{\theta \in \Theta_0}\{\ell(\theta)\} = \theta_0^*$. Minimizing such a loss function often leads to a model with better validation (and test) error, as illustrated in FIG. 1.

Examples Techniques for Learning Linear Loss Functions

We now present an algorithm for approximately solving the optimization problem defined in § 1.1. Recall that, given a set $\Theta \subseteq \mathbb{R}^n$ of models, a user-provided feature vector ϕ: $\Theta \to \mathbb{R}^k$, loss functions of the form $\ell_\lambda(\theta) = \lambda \cdot \phi(\theta)$, and a feasible set $\mathcal{F} \subseteq \mathbb{R}^k$ of λ values, our goal is to solve the bilevel minimization problem:

$$\min_{\lambda \in \mathcal{F}}\{e(\hat{\theta}(\ell_\lambda))\}, \text{ where } \hat{\theta}(\ell_\lambda) = \text{argmin}_{\theta \in \Theta}\{\lambda \cdot \phi(\theta)\} \quad (5)$$

Recall that $e(\theta)$ is the test error of θ, which we may estimate by computing the validation error, $\tilde{e}(\theta)$. As discussed in § 1.2, a solution to this problem has numerous practical applications, including tuning regularization hyperparameters and learning data augmentation policies.

Ideally we would develop an algorithm that always recovers an optimal λ after evaluating validation loss a small (i.e., polynomial in n and k) number of times. Unfortunately, doing so is NP-hard, even in the special case when Θ is a convex set, ϕ and e are convex functions, and ẽ=e.

Theorem 1 Minimizing (5) is NP-hard, even in the special case when $\Theta = [0,1]^n$, $\mathcal{F} = \mathbb{R}^k$, $\phi(\theta) = \theta$, $\tilde{e}(\theta)$ is a convex function, and $\tilde{e}(\theta) = e(\theta) \ \forall \theta \in \Theta$.

Proof (Sketch). If $\phi(\theta) = \theta$, then $\hat{\theta}(\ell_\lambda) = \text{argmin}_{\lambda \in \mathbb{R}^k}\{\lambda \cdot \theta\}$. Assuming ties are broken appropriately in cases where the argmin is not unique, we have $\hat{\theta}(\ell_\lambda) \in \{0,1\}^n$. Furthermore, $\{\hat{\theta}(\ell_\lambda) | \lambda \in \mathbb{R}^k\} = \{0,1\}^n$. Minimizing (5) is therefore equivalent to computing $\min_{x \in \{0,1\}^n}\{\tilde{e}(x)\}$, for an arbitrary convex function ẽ. This optimization problem can be shown to be NP-hard, using a reduction from 0/1 INTEGER PROGRAMMING. End proof.

Formal proofs of all theorems are given in U.S. Provisional Patent Application No. 62/852,029.

Though minimizing (5) is NP-hard in general, in the special case where $\Theta$ is finite, it can be solved efficiently using a variant of the LearnLoss algorithm.

Theorem 2 If $\theta$ is finite, and $\mathcal{F}$ is a hypercube, (5) can be minimized in expected time $O(mk^{2.37} \log k)$, where $m=|\Theta|$ and $k=|\phi(\theta)|$, assuming $\tilde{e}(\theta)=e(\theta)\ \forall \theta \in \Theta$.

Proof. Let the elements of $\Theta$ be indexed in ascending order of validation error, so $\tilde{e}(\theta_1) \leq \tilde{e}(\theta_2) \leq \ldots \leq \tilde{e}(\theta_m)$. If there exists a vector $\lambda \in \mathbb{R}^k$ such that $\hat{\theta}(\ell_\lambda)=\theta_1$, then this $\lambda$ minimizes (5). The constraint $\hat{\theta}(\ell_\lambda)=\theta_1$ is equivalent to the system of linear inequality constraints: $\lambda \cdot \phi(\theta_1) \leq \lambda \cdot \phi(\theta_i)$ for $1 \leq i \leq m$. Whether these constraints are satisfiable for some $\lambda \in \mathcal{F}$ can be determined using linear programming, and the LP can be solved to machine precision in time $O(k^{2.37} \log k)$.

If the LP is feasible, any feasible point is an optimal solution to (5). If not, we can solve a similar LP to check whether there exists a $\lambda \in \mathcal{F}$ that satisfies $\hat{\theta}(\ell_\lambda)=\theta_2$, and so on, stopping as soon as we find an LP that is feasible. Because $\hat{\theta}(\ell_\lambda) \in \Theta$ for all $\lambda$, at least one of the LPs must be feasible. End proof.

Building on Theorem 2, we now present the LearnLoss algorithm for learning a linear loss function, given as input a small set $\Theta_0$ of models whose validation error is known. The LearnLoss algorithm is formally presented in FIG. 2.

The idea of the algorithm is to use the "guess the argmin" trick used in the proof of Theorem 2, to find a $\lambda$ that would be optimal if the loss was minimized over $\Theta_0$ rather than $\Theta$ (i.e., if we replace $\Theta$ by $\Theta_0$ in (5)). However, in the common case where many such $\lambda$ exist, LearnLoss returns the one that minimizes a carefully-chosen cost function that encourages $\ell_\lambda$ to accurately predict validation error. For some $\alpha \in [0,1]$, we minimize $$\text{cost}(\lambda) \equiv \alpha \sum_{\theta \in \Theta_0} (\ell_\lambda(\theta) - \tilde{e}(\theta))^2 + \overbrace{(1-\alpha)\|\nabla \ell_\lambda(\theta) - \nabla \tilde{e}(\theta)\|_2^2}^{\text{optional, if } \tilde{e} \text{ is differentiable}} \quad (6)$$

The LearnLoss algorithm has two desirable theoretical guarantees. First, by an argument similar to the one used to prove Theorem 2, it runs in polynomial time and returns a loss function that would be optimal if the loss was minimized over $\Theta_0$ rather than over $\Theta$, as summarized in Theorem 3. Second, it is provably efficient in certain special cases, as shown in Theorem 4.

Theorem 3 Let $\Theta_0 \subseteq \Theta$ be a finite set of models. Given as input the set of pairs $\{(\tilde{e}(\theta), \phi(\theta))|\theta \in \Theta_0\}$, LearnLoss returns a vector $\lambda \in \text{argmin}_{\lambda \in \mathbb{R}^k} \{\tilde{e}(\hat{\theta}_0(\ell_\lambda))\}$, where $\hat{\theta}_0(\ell_\lambda)=\text{argmin}_{\theta \in \Theta_0}\{\lambda \cdot \phi(\theta)\}$. It runs in time $O(mk^4)$, where $m=|\Theta_0|$ and $k=|\phi(\theta)|$.

If $\Theta$ is finite, Theorem 3 shows that LearnLoss is asymptotically optimal as $\Theta_0 \to \Theta$. Under what circumstances is LearnLoss efficient? To build intuition, we consider the idealized case where there exists a linear loss function that perfectly estimates validation error (and is therefore optimal if $\tilde{e}=e$). In this case, LearnLoss can recover this loss function very efficiently, as shown in Theorem 4.

Theorem 4 Suppose that for some $\lambda^* \in \mathcal{F}$, we have $\lambda^* \cdot \phi(\theta)=\tilde{e}\ \forall \theta \in \Theta$. Then, LearnLoss returns $\lambda^*$ provided that at least k vectors in the set $S_{loss} \cup S_{grads}$ are linearly independent, where:

1. $S_{loss}=\{\phi_i|1 \leq i \leq m\}$, and
2. $S_{grads} \equiv \{J_{ij}|1 \leq i \leq m, 1 \leq j \leq n\}$ if gradients are provided, otherwise $S_{grads}=\emptyset$ where $\phi_i$ and $J_i$ are defined as in the code for LearnLoss.

Proof (Sketch). Because $\ell_{\lambda^*}(\theta)=\tilde{e}(\theta)\ \forall \theta \in \Theta$, we have $\text{cost}(\lambda^*)=0$. Furthermore, because $\ell_{\lambda^*}$ has the same argmin as $\tilde{e}$, $\lambda^*$ is an optimal solution to the first quadratic program considered by LearnLoss (i.e., the quadratic program solved when $i^*=0$). Thus, LearnLoss will return the optimal vector $\lambda^*$, provided the solution to the first quadratic program is unique.

In order to satisfy $\text{cost}(\lambda^*)=0$, the vector $\lambda^*$ must satisfy m linear equations of the form $\lambda^* \cdot \theta_i - \tilde{e}_i 0$. If gradient information is provided, $\lambda^*$ must, additionally, satisfy mn equations of the form $(J_i \lambda^T - \tilde{e}_i)_j = 0$. By assumption, at least k of these equations are linearly independent, which guarantees a unique solution. End proof.

In particular, Theorem 4 shows that if a perfect loss function exists, LearnLoss can recover it given $\tilde{e}(\theta)$, $\phi(\theta)$, and $\nabla \tilde{e}(\theta)$ for just one model. This is clearly a strong assumption that is unlikely to be literally satisfied in practice. Nevertheless, our experiments will show that on certain real-world problems, LearnLoss achieves efficiency similar to what Theorem 4 suggests.

Example Technique for Tuning Loss Functions

The LearnLoss algorithm suggests a natural procedure for tuning loss functions, either based on results of full training runs (as in traditional hyperparameter tuning), or on-the-fly during training. Let $\Theta_0$ be an initial set of trained models (obtained, for example, as intermediate checkpoints when minimizing an initial "default" loss function). After computing the validation error of each $\theta \in \Theta_0$, we run LearnLoss to obtain a loss function $\ell_1$. We then minimize $\ell_1$ to obtain a model, $\theta_1$. Computing the validation error of $\theta_1$ then provides an additional data point we can use to re-run LearnLoss, obtaining a refined loss function $\ell_2$, and so on. Pseudocode is given in FIG. 3.

TuneLoss makes use of a subroutine, train_with_warm_start. If this subroutine runs on online algorithm such as AdaGrad for a small number of mini-batches, then TuneLoss will adjust the loss function online during training. If the subroutine instead performs a full training run (possibly ignoring the second argument), TuneLoss becomes a sequential hyperparameter tuning algorithm. TuneLoss can also be modified to provide the optional gradient information in the calls to LearnLoss.

Example Devices and Systems

Figure 4A:
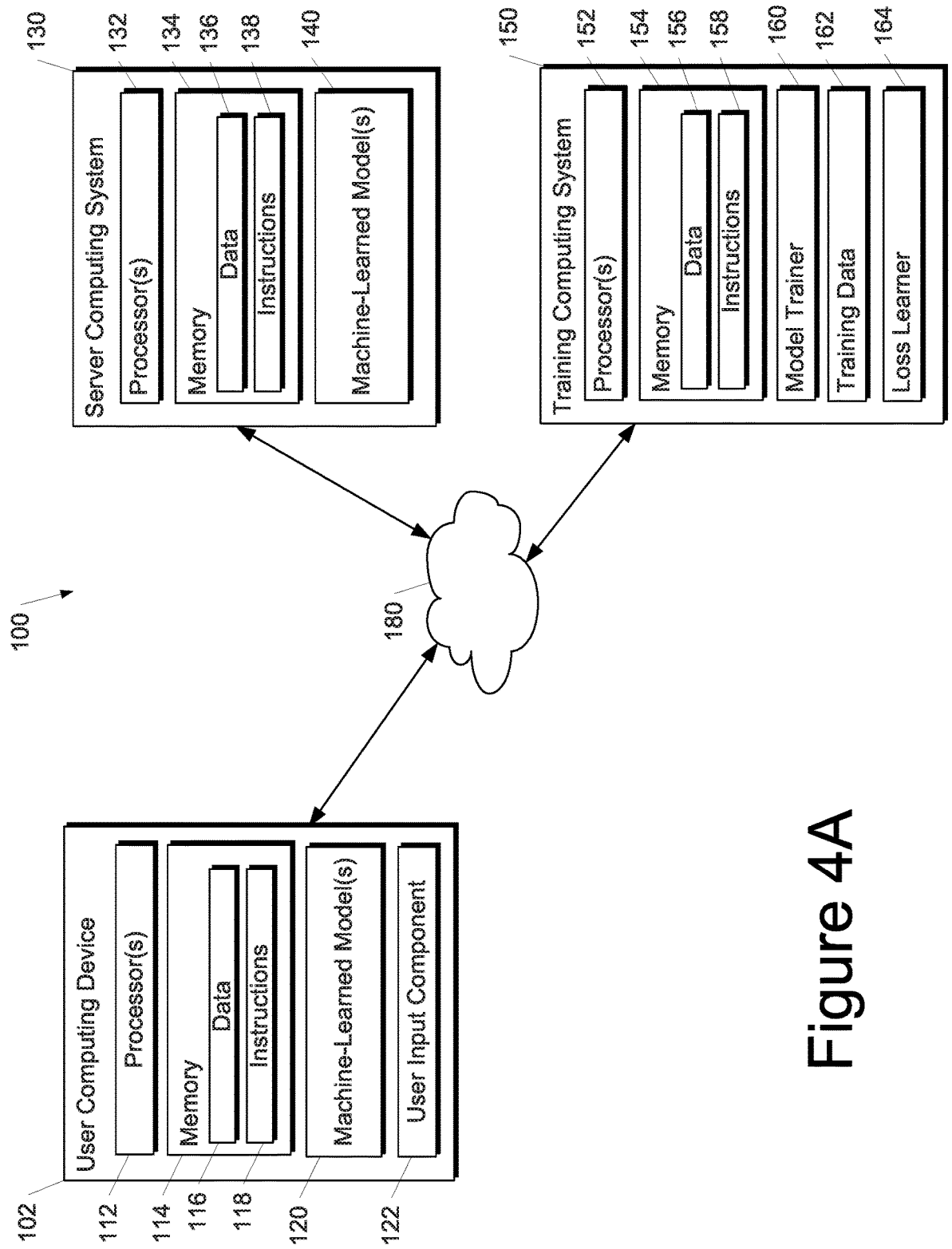
FIG. 4A depicts a block diagram of an example computing system according to example embodiments of the present disclosure.

FIG. 4A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 153 and a memory 154. The one or more processors 153 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 153 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, labeled training data, weakly labeled training data, and/or unlabeled training data.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The training computing system 150 can also include a loss learner 164. The loss leaner 164 can operate to learn a loss function by performing any of the techniques described herein, including, as examples, the LearnLoss algorithm, the TuneLoss algorithm, method 500 of FIG. 5, and/or other techniques.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The loss learner 164 includes computer logic utilized to provide desired functionality. The loss learner 164 can be implemented in hardware, firmware, and/or software controlling a general purpose processor. For example, in some implementations, the loss learner 164 includes program files stored on a storage device, loaded into a memory and executed by one or more processors. In other implementations, the loss learner 164 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 4A illustrates one example computing system that can be used to implement the present disclosure. Other computing systems can be used as well. For example, in some implementations, the user computing device 102 can include the model trainer 160, the training dataset 162, and/or the loss learner 164. In such implementations, the models 120 can be both trained and used locally at the user computing device 102. In some of such implementations, the user computing device 102 can implement the model trainer 160 to personalize the models 120 based on user-specific data.

Figure 4B:
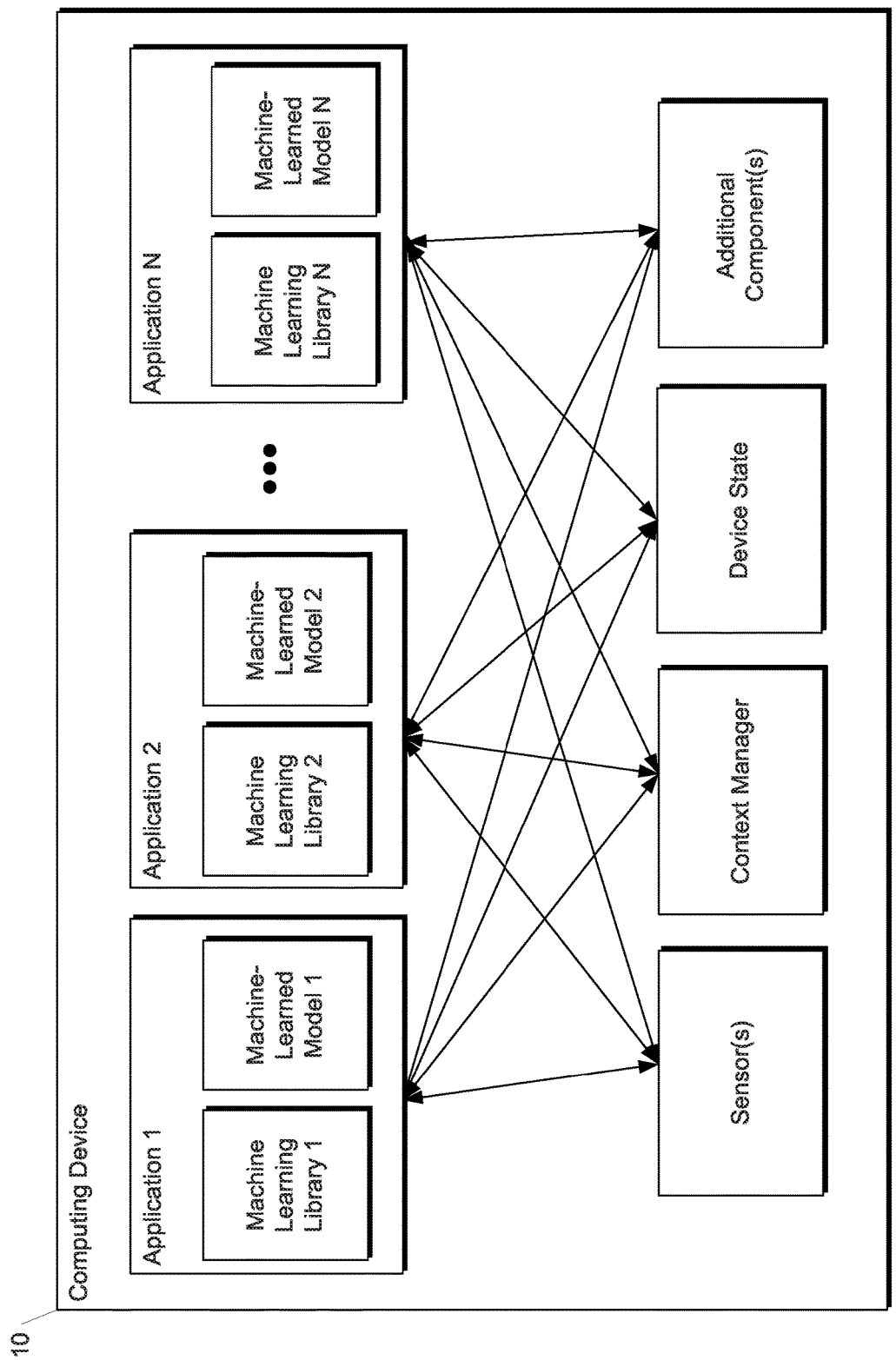
FIG. 4B depicts a block diagram of an example computing device according to example embodiments of the present disclosure.

FIG. 4B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
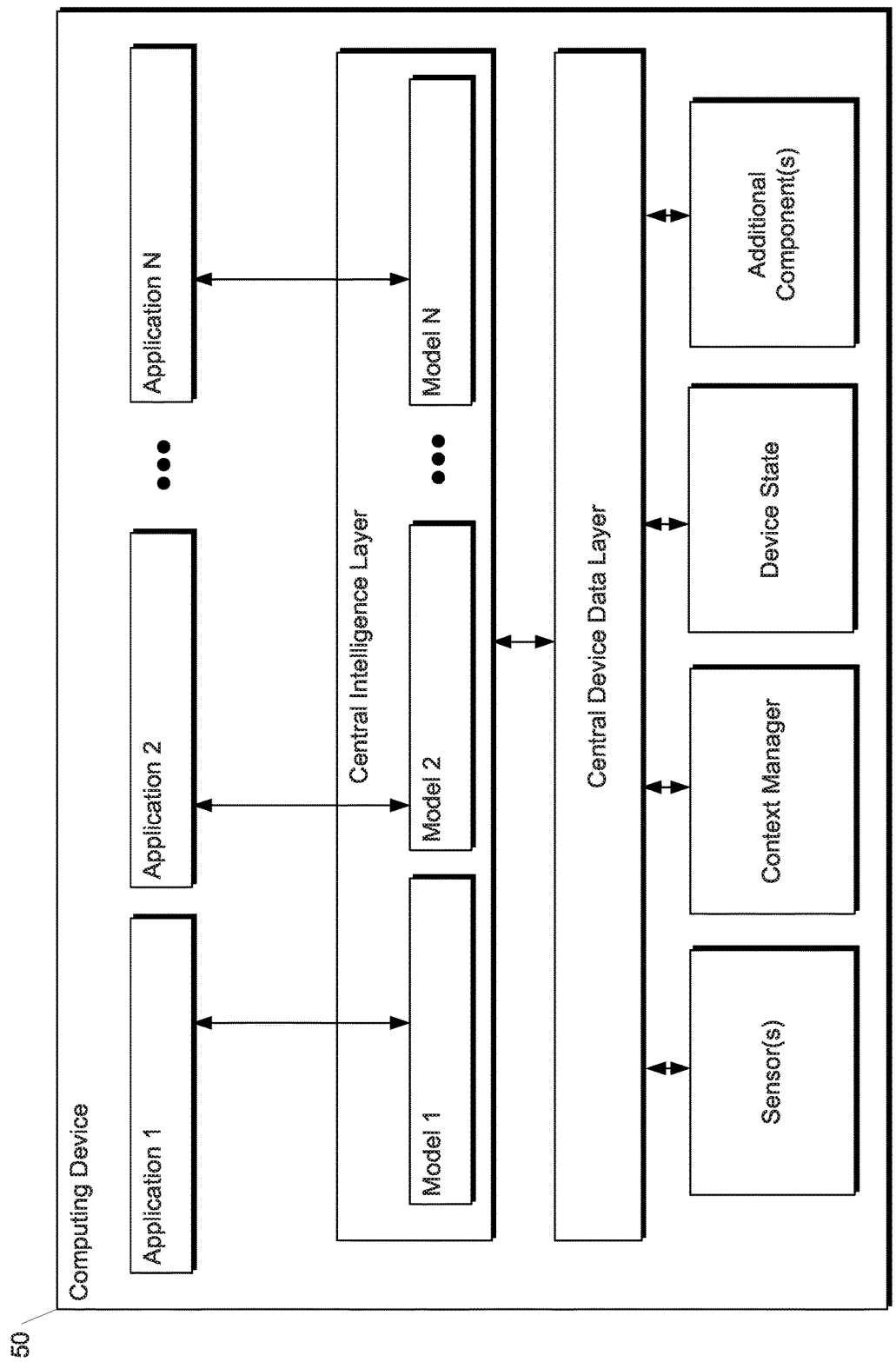
FIG. 4C depicts a block diagram of an example computing device according to example embodiments of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 5:
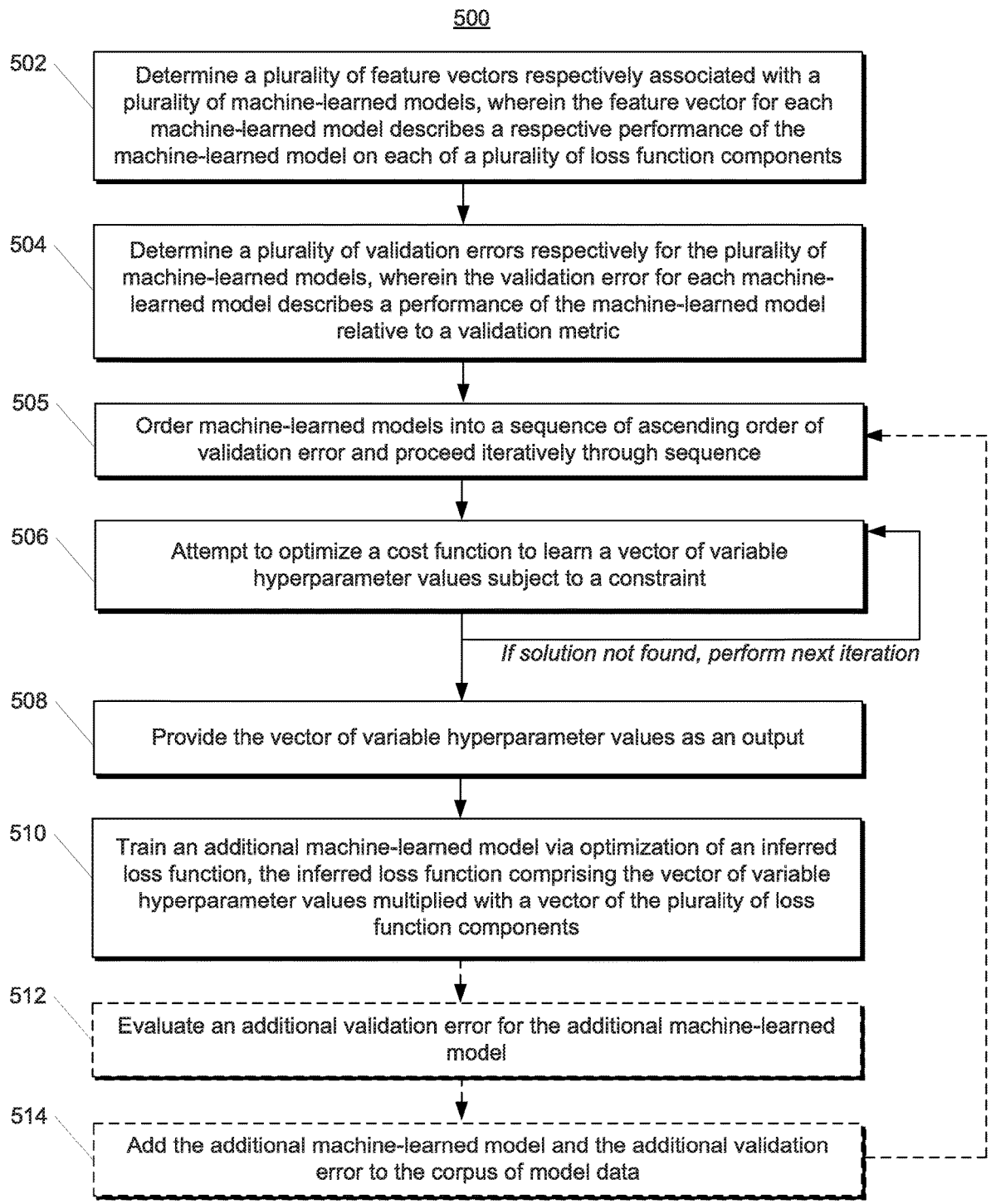
FIG. 5 depicts a flow chart diagram of an example method to learn a loss function according to example embodiments of the present disclosure.

FIG. 5 depicts a flow chart diagram of an example method 500 to perform according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can determine a plurality of feature vectors respectively associated with a plurality of machine-learned models. The feature vector for each machine-learned model describes a respective performance of the machine-learned model on each of a plurality of loss function components. For example, the plurality of loss function components can be set, selected, and/or defined by a user.

The computing system can run the models to determine the feature vectors or the computing system can determine the feature vectors by receiving them from another computing system. The feature vectors can be determined as part of training the machine-learned models and/or can be determine separately (e.g., in parallel with) training of the machine-learned models.

As one example, the computing system can have a process running in parallel to training of the model(s), which reads model checkpoints and computes the values of the features/loss components. This can be done, for example, in parallel with computing validation error.

As another example, the computing system can also approximately compute some components of the feature vector(s) during training. For example, if logloss(θ) is one of the plurality of loss function components (which can also be referred to as the features), and the system is training using stochastic gradient descent with mini-batches, the computing system can assess the values of log loss for the last few mini-batches, as an estimate of log loss over the entire training dataset. In cases where training the model includes optimizing a loss function that has log loss as one of the terms, this requires no extra work, because the system would be computing log loss for each mini-batch anyway as part of training.

The machine-learned models can be trained on some or all of the plurality of loss function components or can be trained using loss functions that include components that are not included in the plurality of loss function components.

As one example, the plurality of machine-learned models can be or include a plurality of different versions of a same machine-learned model respectively saved at a plurality of training checkpoints of a training process.

In one example, the plurality of loss function components can include one or more of: a logloss loss function component; an L1 regularization loss function component; an L2 regularization loss function component; a uniform-labeled loss function component, a dropout loss function component, and/or various other types of loss function components.

In another example, the plurality of loss function components can include a plurality of loss function components that respectively correspond to a plurality of different augmentation operations performed on a set of training data.

In yet another example, the plurality of loss function components can include a plurality of convex, non-negative, piecewise-linear functions.

At 504, the computing system can obtain a plurality of validation errors respectively for the plurality of machine-learned models, wherein the validation error for each machine-learned model describes a performance of the machine-learned model relative to a validation metric. In some implementations, the validation error for each machine-learned model approximates a test error for the machine-learned model. The test error can be any test error, including, for example, any top-n test error metric (e.g., top-1, top-5, etc.).

At 505, the computing system can order the machine-learned models (e.g., the data associated therewith) into a sequence with ascending order of validation error. The computing system can then iteratively proceed through the sequence (e.g., one model/pair of data) at a time, for example, until a solution is found.

At 506, the computing system can attempt to optimize a cost function to learn a vector of variable hyperparameter values subject to a constraint. The cost function can evaluates a sum, for all of the machine-learned models, of an absolute or squared error between a respective loss function for each machine-learned model and the validation error for such machine-learned model. The respective loss function for each machine-learned model comprises the feature vector for the machine-learned model respectively multiplied by a vector of variable hyperparameter values.

The constraint can require, for example, that the vector of variable hyperparameter values be such that minimization of the respective loss for each machine-learned model returns a current machine-learned model associated with a current optimization iteration. Thus, at each optimization iteration, the computing system can attempt to minimize the cost function subject to a constraint that says the vector of hyperparameter values must be such that if the system minimizes the learned loss function over all the m provided models, the system gets back the model with the current iteration index. So at the first optimization iteration, the system is only considering loss functions whose argmin (e.g., evaluated over the plurality of models) is the model with best validation error. The motivation for this constraint is set form in Theorems 2 and 3, described above.

In some implementations, the cost function further evaluates a sum, for all of the machine-learned models, of an absolute or squared error between a gradient of the respective feature vector for each machine-learned model and a gradient of the validation error for such machine-learned model. This can enable the computing system to learn the hyperparameter values more efficiently.

In some implementations, attempting to optimize the cost function can include solving a quadratic program. For example, the ellipsoid method or derivatives thereof can be performed to solve the quadratic program.

If the cost function is successfully optimized at 506, then at 508, the computing system can provide the vector of variable hyperparameter values as an output. In such fashion, the method 500 can learn improved hyperparameter values for an overall loss function.

At 510, the computing system can train an additional machine-learned model via optimization of an inferred loss function. The inferred loss function can be generated through multiplication of the vector of variable hyperparameter values with a vector of the plurality of loss function components. In some implementations, the method 500 can conclude at 510, while in other implementations the method 500 can continue to 512.

At 512, the computing system can evaluate an additional validation error for the additional machine-learned model.

At 514, the computing system can add the additional machine-learned model (and/or a feature vector therefor) and the additional validation error to the corpus of model data obtained at 502 and 504.

After 514, the method 500 can optionally return to 505 and again order the models and attempt to optimize the cost function. In such fashion, method 500 can be iteratively performed to iteratively learn improved hyperparameter values for the loss function.

In some implementations in which the plurality of loss function components respectively correspond to a plurality of different augmentation operations performed on a set of training data, the method 500 can further include determining an optimal probability distribution for the plurality of different augmentation operations based at least in part on the vector of variable hyperparameter values.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to learn improved loss functions, the method comprising:
for each of one or more learning iterations:
determining, by one or more computing devices, a plurality of feature vectors respectively associated with a plurality of machine-learned models, wherein determining the feature vector for each machine-learned model is based on evaluating a respective performance of the machine-learned model on each of a plurality of loss function components with respect to a set of training data;
determining, by one or more computing devices, a plurality of validation errors respectively for the plurality of machine-learned models, wherein determining the validation error for each machine-learned model is based on evaluating a performance of the machine-learned model relative to a validation metric with respect to a set of test data that is separate from the set of training data; and
for each of one or more optimization iterations respectively associated with one or more of the machine-learned models:
determining a vector of variable hyperparameters that is subject to a constraint, by the one or more computing devices, based on an optimization algorithm for a cost function that evaluates a sum, for all of the machine-learned models, of an absolute or squared error between a respective loss function for each machine-learned model that is based on the set of training data and the validation error for such machine-learned model that is based on the set of test data, wherein the respective loss function for each machine-learned model comprises the feature vector for the machine-learned model respectively multiplied by the vector of variable hyperparameter values and wherein the constraint requires that the vector of variable hyperparameter values be such that minimization of the respective loss for each machine-learned model returns a current machine-learned model associated with a current optimization iteration;
determining, by the one or more computing devices, an inferred loss function based on the vector of variable hyperparameter values; and
training, by the one or more computing devices, an additional machine-learned model based on the inferred loss function and the set of training data.

2. The computer-implemented method of claim 1, wherein the cost function further evaluates a sum, for all of the machine-learned models, of an absolute or squared error between a gradient of the respective feature vector for each machine-learned model and a gradient of the validation error for such machine-learned model.

3. The computer-implemented method of claim 1, further comprising, for each learning iteration:
ordering, by the one or more computing devices, the machine-learned models into a sequence with ascending order of validation error;
wherein the one or more optimization iterations proceed through the sequence until the cost function is successfully optimized subject to the constraint.

4. The computer-implemented method of claim 1, further comprising:
training, by the one or more computing devices, the additional machine-learned model via an optimization of the inferred loss function, the inferred loss function comprising the vector of variable hyperparameter values multiplied with a vector of the plurality of loss function components.

5. The computer-implemented method of claim 1, wherein the cost function comprises solving, by the one or more computing devices, a quadratic program.

6. The computer-implemented method of claim 1, wherein at least a first machine-learned model of the plurality of machine-learned models was trained using a first training loss function that differs from a second training loss function that was used to train at least a second machine-learned model of the plurality of machine-learned models.

7. The computer-implemented method of claim 1, wherein the plurality of loss function components comprise:
a logloss loss function component;
an L1 regularization loss function component; and
an L2 regularization loss function component.

8. The computer-implemented method of claim 1, wherein the plurality of loss function components respectively correspond to a plurality of different augmentation operations performed on a set of training data.

9. The computer-implemented method of claim 8, further comprising:
determining, by the one or more computing devices, an optimal probability distribution for the plurality of different augmentation operations based at least in part on the vector of variable hyperparameter values.

10. The computer-implemented method of claim 1, wherein the plurality of loss function components comprise a plurality of convex, non-negative, piecewise-linear functions.

11. The computer-implemented method of claim 1, wherein:
the one or more learning iterations comprise a plurality of learning iterations; and
each learning iteration further comprises:
training, by the one or more computing devices, the additional machine-learned model via an optimization of the inferred loss function, the inferred loss function comprising the vector of variable hyperparameter values multiplied with a vector of the plurality of loss function components; and
evaluating, by the one or more computing devices, an additional validation error for the additional machine-learned model, wherein the validation error for the additional machine-learned model is supplied as input for a next sequential learning iteration of the plurality of learning iterations.

12. The computer-implemented method of claim 11, wherein training, by the one or more computing devices, the additional machine-learned model via optimization of the inferred loss function comprises warm start training, by the one or more computing devices, the additional machine-learned model via optimization of the inferred loss function.

13. The computer-implemented method of claim 1, wherein the validation error for each machine-learned model approximates a test error for the machine-learned model.

14. The computer-implemented method of claim 1, wherein the plurality of machine-learned models comprise a plurality of different versions of a same machine-learned model respectively saved at a plurality of training checkpoints of a training process.

15. A computing system comprising:
one or more processors; and
one or more non-transitory computer-readable media that collectively store instructions that, when executed by the one or more processors, cause the computing system to perform operations, the operations comprising, for each of one or more learning iterations:
determining, by the computing system, a plurality of feature vectors respectively associated with a plurality of machine-learned models, wherein determining the feature vector for each machine-learned model is based on evaluating a respective performance of the machine-learned model on each of a plurality of loss function components with respect to a set of training data;
determining, by the computing system, a plurality of validation errors respectively for the plurality of machine-learned models, wherein determining the validation error for each machine-learned model is based on evaluating a performance of the machine-learned model relative to a validation metric with respect to a set of test data that is separate from the set of training data; and
for each of one or more optimization iterations respectively associated with one or more of the machine-learned models:
determining a vector of variable hyperparameters that is subject to a constraint, by the computing system, based on an optimization algorithm for a cost function that evaluates a sum, for all of the machine-learned models, of an absolute or squared error between a respective loss function for each machine-learned model that is based on the set of training data and the validation error for such machine-learned model that is based on the set of test data, wherein the respective loss function for each machine-learned model comprises the feature vector for the machine-learned model respectively multiplied by the vector of variable hyperparameter values and wherein the constraint requires that the vector of variable hyperparameter values be such that minimization of the respective loss for each machine-learned model returns a current machine-learned model associated with a current optimization iteration;
determining, by the computing system, an inferred loss function based on the vector of variable hyperparameter values; and
training, by the computing system, an additional machine-learned model based on the inferred loss function and the set of training data.

16. The computing system of claim 15, wherein the cost function further evaluates a sum, for all of the machine-learned models, of an absolute or squared error between a gradient of the respective feature vector for each machine-learned model and a gradient of the validation error for such machine-learned model.

17. The computing system of claim 15, wherein the operations further comprise, for each learning iteration:
ordering, by the computing system, the machine-learned models into a sequence with ascending order of validation error;
wherein the one or more optimization iterations proceed through the sequence until the cost function is successfully optimized subject to the constraint.

18. The computing system of claim 15, wherein the operations further comprise:
training, by the computing system, the additional machine-learned model via an optimization of the inferred loss function, the inferred loss function comprising the vector of variable hyperparameter values multiplied with a vector of the plurality of loss function components.

19. The computing system of claim 15, wherein the cost function comprises solving, by the computing system, a quadratic program.

20. One or more non-transitory computer-readable media that collectively store a vector of variable hyperparameters generated by performance of operations by a computing system, the operations comprising:
determining, by the computing system, a plurality of feature vectors respectively associated with a plurality of machine-learned models, wherein determining the feature vector for each machine-learned model is based on evaluating a respective performance of the machine-learned model on each of a plurality of loss function components with respect to a set of training data;
determining, by the computing system, a plurality of validation errors respectively for the plurality of machine-learned models, wherein determining the validation error for each machine-learned model is based on evaluating a performance of the machine-learned model relative to a validation metric with respect to a set of test data that is separate from the set of training data; and
for each of one or more optimization iterations respectively associated with one or more of the machine-learned models:
determining a vector of variable hyperparameters that is subject to a constraint, by the computing system, based on an optimization algorithm for a cost function that evaluates a sum, for all of the machine-learned models, of an absolute or squared error between a respective loss function for each machine-learned model that is based on the set of training data and the validation error for such machine-learned model that is based on the set of test data, wherein the respective loss function for each machine-learned model comprises the feature vector for the machine-learned model respectively multiplied by the vector of variable hyperparameter values and wherein the constraint requires that the vector of variable hyperparameter values be such that minimization of the respective loss for each machine-learned model returns a current machine-learned model associated with a current optimization iteration;
determining, by the computing system, an inferred loss function based on the vector of variable hyperparameter values; and
training, by the computing system, an additional machine-learned model based on the inferred loss function and the set of training data.

\* \* \* \* \*